W. DANENHOWER.
TYPE WASHING MACHINE.
APPLICATION FILED OCT. 28, 1907.

902,861.

Patented Nov. 3, 1908.

2 SHEETS—SHEET 1.

Witnesses,
Carrie R. Ivy
William W. Raley

Inventor,
Washington Danenhower
By Cyrus Kehr
Attorney.

THE NORRIS PETERS CO., WASHINGTON, D. C.

W. DANENHOWER.
TYPE WASHING MACHINE.
APPLICATION FILED OCT. 28, 1907.
902,861.
Patented Nov. 3, 1908.
2 SHEETS—SHEET 2.
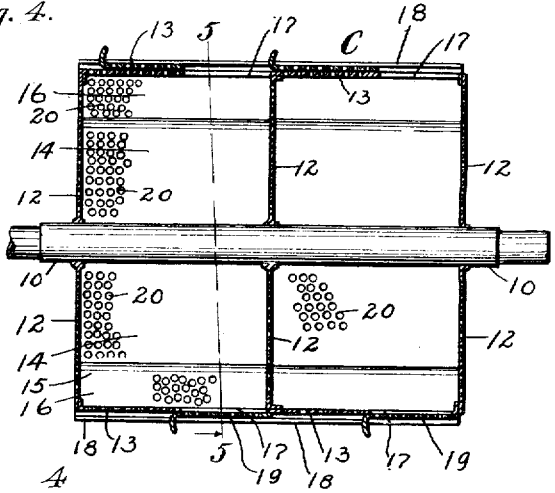
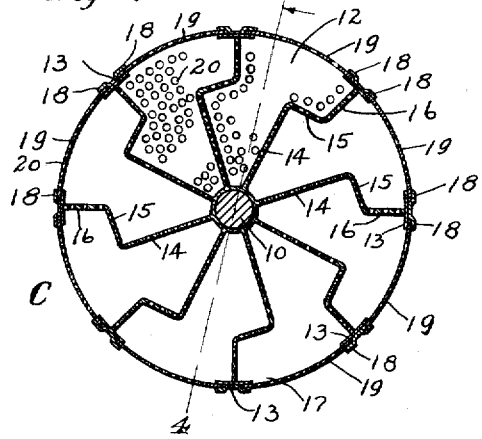
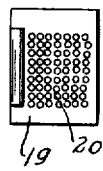
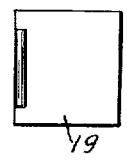
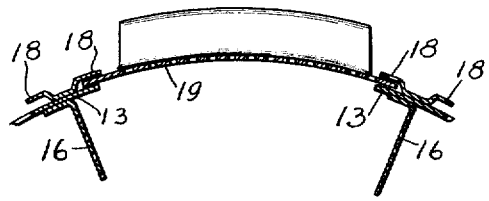
Witnesses,
Carrie R. Ivy
William Whaley
Inventor,
Washington Danenhower
By Cyrus Kehr
Attorney.

UNITED STATES PATENT OFFICE.

WASHINGTON DANENHOWER, OF KNOXVILLE, TENNESSEE.

TYPE-WASHING MACHINE.

No. 902,861.      Specification of Letters Patent.      Patented Nov. 3, 1908.

Application filed October 28, 1907. Serial No. 399,424.

*To all whom it may concern:*

Be it known that I, WASHINGTON DANENHOWER, a citizen of the United States, residing at Knoxville, in the county of Knox and State of Tennessee, have invented a new and useful Improvement in Type-Washing Machines, of which the following is a specification, reference being had to the accompanying drawing.
My improvement relates to machines for washing printers' type after such type has been used and has taken on accumulations of ink, dust, and other matter.

Figure 1:
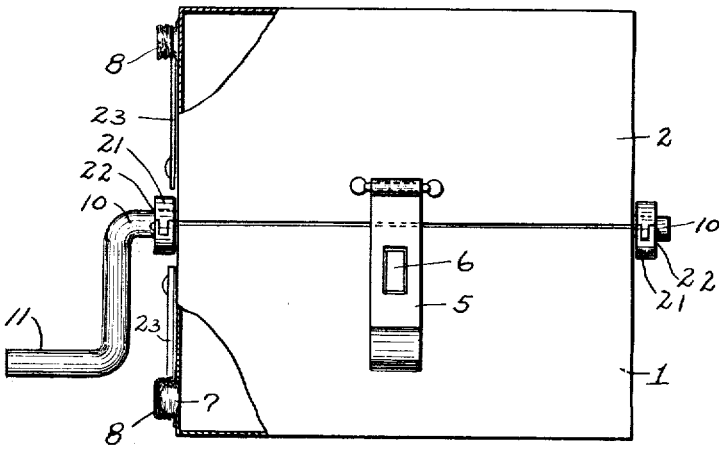
Figure 2:
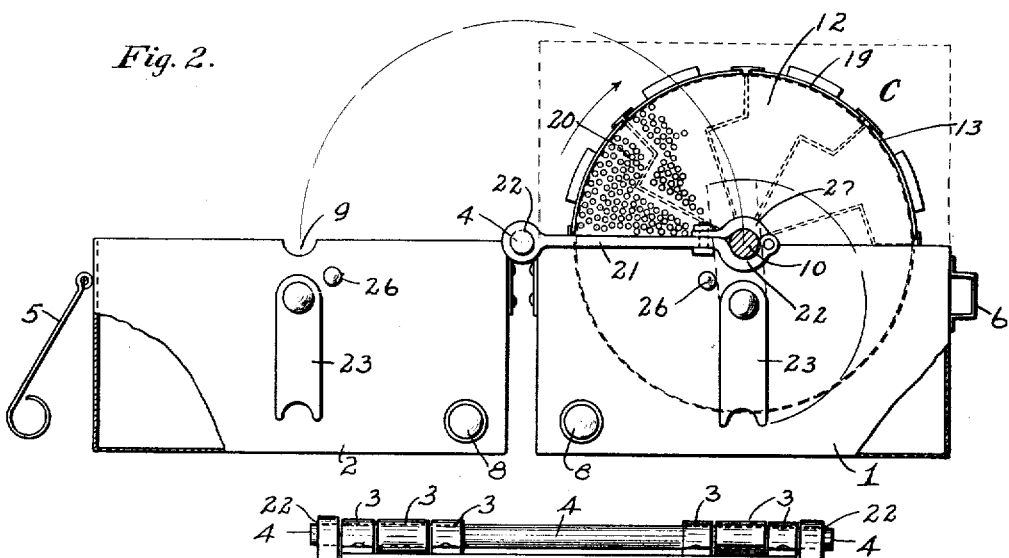
Figure 3:
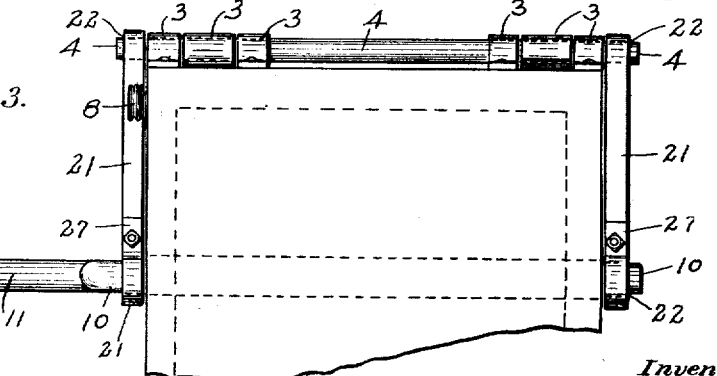

The object of the invention is to provide an apparatus by means of which considerable quantities of such type may be effectively and rapidly cleansed and drained, the different "sorts" of type being kept separate from each other.
In the accompanying drawings, Figure 1 is a side elevation of an apparatus embodying my improvement, the apparatus being closed as when not in use; Fig. 2 is a front elevation, the apparatus being open ready for use; Fig. 3 is a plan view of the apparatus as shown in Fig. 1, a portion being broken away; Fig. 4 is a longitudinal, sectional view of the cylinder, on the line 4—4 of Fig. 5, looking toward the left; Fig. 5 is a transverse section on the line 5—5 of Fig. 4, looking toward the right; Figs. 6 and 7 are detail views of slides serving as doors for the cylinder compartments; Fig. 8 is a transverse sectional detail of one of the cylinder compartment doors.

Referring to said drawings, 1 is a tank member constituting the base of the machine, and 2 is a similar hollow member serving as a tank when the apparatus is in use and also as a top for the apparatus when the latter is not in use. Said two members are joined to each other along adjacent free side edges by alternating eye members, 3, located on said two members and a pintle shaft, 4, extending through said eye members. Thus the tank member, 2, may be folded or turned over upon the tank member, 1, so that the two of said members together constitute a box inclosing the cylinder, to be hereinafter described, when the apparatus is not in use. To the side wall of the tank member, 2, which is opposite said hinge there is applied a slotted hasp, 5, adapted to receive a loop, 6, on the corresponding wall of the tank member, 1, when the member, 2, rests upon said member, 1. By this means, the member, 2, is secured in the closed position upon the member, 1. Each of said tank members, 1 and 2, is provided at one end, and near the bottom, with a port, 7, for the discharge of liquids from said members; and each such port is to be closed in any suitable manner, as by means of a screw cap, 8, as shown in the drawings. Said tank members are preferably made of sheet metal of sufficient thickness to bear the weight of the cylinder and the type carried by the cylinder during the washing operation. At the middle of the upper edge of each end wall of the tank members, 1 and 2, is a notch or bearing, 9, preferably half-circular.

C is a cylinder into which the type is placed for the washing operation. Said cylinder comprises an axial shaft, 10, having at one end a crank, 11. Said cylinder further comprises any desired number of circular plates, 12, surrounding and concentric with the axis. Said cylinder further comprises a tubular wall concentric with said shaft and surrounding the circular plates, 12. The intermediate circular plates, 12, divide the cylinder transversely into compartments. The drawings show only three such circular plates; and there is therefore only one intermediate plate, and that plate divides the cylinder transversely into two compartments. Each of said transverse compartments is further divided by irregular radial, longitudinal walls, 14—15—16, 14 designating a portion of said wall extending radially from the shaft, 10, to an off-set portion, 15, approximately at right angles to the portion, 14, and 16 being another radial portion extending from the edge of the portion, 15, opposite the portion, 14, to the tubular wall, 13, as seen in Figs. 2 and 5. By an inspection of said figures it will be seen that the compartments formed by said irregular partitions consist of an inner and an outer portion, the inner portion being partially inclosed by two wall portions, 14, and one off-set portion, 15, while the outer portion of said compartment is partially inclosed by the tubular wall, 13, two wall portions, 16, and one off-set wall portion, 15.

The drawings show eight such irregular radial partitions dividing each of the two transverse compartments. Hence the entire cylinder contains sixteen distinct compartments. And each such compartment is provided with an opening or port, 17, through which type may be inserted and discharged. Along each side of each of said ports a lip, 18, is applied to the tubular wall, 13, far enough away from the latter to receive the edge of a slide plate, 19, constituting a door for such opening. In the form shown in the drawings, a single piece of sheet metal is used for forming such lips along adjacent ports, the opposite edges of said metal strip being raised to form such lips, and the middle portion being secured to the tubular wall, 13, over the adjacent radial partition. Since the compartments of the cylinder are thus provided with individual ports and individual slides for closing each port, type may be put into or discharged from any compartment without opening the port of any other compartment.

The partitions and the tubular wall of the cylinder and the slide plates are preferably perforated so as to permit the ready passage of the cleansing and rinsing liquids when the cylinder is being rotated and when the cylinder is thereafter held stationary in an elevated position for draining. The drawings show perforations, 20, in portions of said cylinder.

The operation is as follows: A cleansing solution, for example, a solution of lye, is put into one of the tank members, preferably the base member, 1, in order that said solution may be used repeatedly before being discharged from the port, 7. A rinsing liquid, such as ordinary clean water, is placed into the other tank member. Unclean type is placed into each compartment through the port, 17, of said compartment, and said port then closed by moving the adjacent slide plate, 19, across said port. The cylinder, C, is then placed into the tank member containing the cleansing solution, the shaft, 10, resting in the bearings, 9. The cylinder is then rotated by turning the crank, 11, preferably so as to turn the cylinder clockwise as viewed in Figs. 2 and 4. Such rotation moves the lower portion of the cylinder, and the type in the lower compartments of the cylinder, through the cleansing liquid. The type in the lower portion of the cylinder will, as is obvious from an inspection of said figures of the drawings, rest upon the tubular wall, 13. But, as a lower compartment moves toward the left and upward, the type of said compartment gradually shift or slide downward until they rest upon the lower radial wall portion, 16, of said compartment; and as said compartment moves higher, the type slide toward the cylinder axis and tumble downward over the adjacent off-set partition portion, 15. Then, while said compartment rises still higher, the type slide down the adjacent radial wall portion, 14, and rest between said radial portions, 15, of said compartment until said compartment is moved toward the right across the cylinder axis far enough to incline the right hand (now the left hand) of said two partition portions, 14, downward. Then the type will slide down said portion and tumble over the adjacent off-set portion, 15, and upon the adjacent portion, 16. From this latter position, the type subsequently slides along the curved wall, 13, to the next succeeding partition portion, 16. Thus, during each rotation of the cylinder, the type in each compartment "tumbles" twice over an offset-portion of the partition and slides three times along other portions of the walls of the compartment. In this way, the adhering type are forcibly separated from each other and all the type are moved upon and over each other to such an extent as to subject all surfaces to a degree of attrition sufficient for loosening and removing all accumulations of dirt therefrom.

When the cylinder has been rotated a sufficient time for this portion of the operation, the cylinder is lifted out of the liquid and held above said liquid long enough to permit drainage back into said tank member. Then the cylinder is lifted over into the adjoining tank member, the shaft, 10, being placed in the bearings, 9, of that member. Then the cylinder is similarly rotated until the liquid in said tank member completely rinses the type in the cylinder, the type sliding and tumbling in the compartments as before. Then the cylinder is raised and held over said tank member to permit the ringsing water to drain therefrom.

To facilitate the shifting or transferring of the cylinder from one tank member to the other, a connecting bar or arm, 21, is applied to each end of the shaft, 10, and to the adjacent end of the pintle, 4, said bar having at each end a bearing, 22, to receive said shaft and said pintle. The distances between said pintle and the bearings, 9, of the tank members are equal. Hence the cylinder and the connecting arms may be together lifted from one tank member and turned into position on the other, the cylinder axis being carried through half circles of which the connecting arms are radii. A supporting member or prop, 23, is applied to each tank member beneath the bearing, 9. One end of said prop is hinged to the end wall of the tank member at 24 while the opposite end of said prop is provided with a notch, 25. When the cylinder is raised for drainage, said prop is turned so as to bring the free end up and the shaft, 10, is then allowed to descend and rest in said notch. In such position, the cylinder may be left any desired length of time for drainage. A stop, 26, is placed adjacent each prop, 23, to support the latter in the elevated position when the connecting arm, 21, is not used.

To permit the ready removal of the cylinder, C, from the apparatus so that it may be carried to a table for filling and emptying, the connecting arms, 21, may be provided with a latch, 27, as shown in the drawings.

I claim as my invention:

1. In an apparatus of the nature described, two tank members each provided with journal bearings, and a cylinder having journals adapted to rest in the bearings of either of said tank members and having a crank and having compartments for receiving type.

2. In an apparatus of the nature described, two tank members each provided with bearings, a cylinder having journals adapted to rest in the bearings of either of said tank members and having a crank and having compartments for receiving type, and mechanism for guiding the cylinder from one tank to the other.

3. In an apparatus of the nature described, two tank members each provided with bearings, a cylinder having journals adapted to rest in the bearings of either of said tank members and having a crank and having compartments for receiving type, and connecting arms joining the shaft of said cylinder to said tank members on a line intermediate the bearings of said tank members.

4. In an apparatus of the nature described, two tank members each provided with bearings, a cylinder having journals adapted to rest in the bearings of either of said tank members and having a crank and having compartments for receiving type, and detachable connecting arms joining the shaft of said cylinder to said tank members on a line intermediate the bearings of said tank members.

5. In an apparatus of the nature described, two tank members each provided with bearings and with hinge members, a pintle shaft extending through said hinge members, a cylinder having journals adapted to rest in the bearings of either of said tank members, and connecting arms joined to the shaft of said cylinder and to said pintle shaft.

6. In an apparatus of the nature described, two tank members each provided with bearings, a cylinder having journals adapted to rest in the bearings of either of said tank members and having a crank and having compartments for receiving type, and props for holding the cylinder elevated.

7. In an apparatus of the nature described, two tank members each provided with bearings and hinged to each other, a cylinder having journals adapted to rest in the bearings of either of said members, and connecting arms joined by one end to the shaft of said cylinder and having the other end hinged on the hinge line of the tank members.

8. In an apparatus of the nature described, a tank member provided with bearings, and a cylinder having journals adapted to rest in said bearings and said cylinder having off-set longitudinal partitions.

In testimony whereof I have signed my name, in presence of two witnesses, this 24th day of October, in the year one thousand nine hundred and seven.

WASHINGTON DANENHOWER.

Witnesses:
CYRUS KEHR,
WALTER McCOY.